(12) United States Patent
Shen et al.

(10) Patent No.: US 11,782,203 B1
(45) Date of Patent: Oct. 10, 2023

(54) DISPLAY DEVICE

(71) Applicant: Darwin Precisions Corporation, Hsinchu County (TW)

(72) Inventors: Yu-Shan Shen, Hsinchu County (TW); Tsung-Ping Pai, Hsinchu County (TW); Yu-Huan Chiu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 17/955,582

(22) Filed: Sep. 29, 2022

(51) Int. Cl.
*F21V 8/00* (2006.01)

(52) U.S. Cl.
CPC ......... *G02B 6/0036* (2013.01); *G02B 6/0038* (2013.01)

(58) Field of Classification Search
CPC ............................ G02B 6/0036; G02B 6/0038
See application file for complete search history.

(56) References Cited

U.S. PATENT DOCUMENTS

| | | | |
|---|---|---|---|
| 2009/0097273 A1* | 4/2009 | Chang | G02B 6/0055 362/618 |
| 2012/0014136 A1 | 1/2012 | Lee | |
| 2020/0057187 A1* | 2/2020 | Sang | G02B 6/0035 |

FOREIGN PATENT DOCUMENTS

| | | |
|---|---|---|
| TW | 201321175 A | 6/2013 |
| TW | M499574 U | 4/2015 |

OTHER PUBLICATIONS

Wang, "Front Light Module and front light guide plate of high-contrast structure" U.S. Appl. No. 17/942,299, filed Sep. 12, 2022, USA.

* cited by examiner

*Primary Examiner* — Keith G. Delahoussaye
(74) *Attorney, Agent, or Firm* — WPAT, P.C

(57) ABSTRACT

A display device includes a light source and a front light plate. The light source is configured to emit light. The front light plate faces toward the light source. The front light plate is configured to receive the light. The front light plate includes a first microstructure and a second microstructure. The first microstructure is located on a first surface of the front light plate. The first microstructure has a first width. A conic constant of the first microstructure is in a range from −0.95 to 10. The second microstructure is adjacent to the first microstructure. The second microstructure has a second width. The first width of the first microstructure is greater than the second width of the second microstructure.

10 Claims, 4 Drawing Sheets

DISPLAY DEVICE

BACKGROUND

Field of Invention

The present disclosure relates to a front light plate and a display device applying the front light plate.

Description of Related Art

In general, a conventional front light plate applied to a display device may generally receive light emitted by a light source, and the conventional front light plate may refract the light to a reflective display panel located below the conventional front light plate. However, an effect of the conventional front light plate refracting the light to the reflective display panel is limited, so that a brightness difference of a front light module between a bright state and a dark state is small. Therefore, an optical performance of the display device may not be improved.

SUMMARY

An aspect of the present disclosure is related to a display device.

According to one embodiment of the present disclosure, a display device includes a light source and a front light plate. The light source is configured to emit light. The front light plate faces toward the light source. The front light plate is configured to receive the light. The front light plate includes a first microstructure and a second microstructure. The first microstructure is located on a first surface of the front light plate. The first microstructure has a first width. A conic constant of the first microstructure is in a range from −0.95 to 10. The second microstructure is adjacent to the first microstructure. The second microstructure has a second width. The first width of the first microstructure is greater than the second width of the second microstructure.

In one embodiment of the present disclosure, the first microstructure extends from the first surface of the front light plate to a second surface of the front light plate opposite to the first surface.

In one embodiment of the present disclosure, the display device further includes a first optical adhesive, a covering layer and a second optical adhesive. The first optical adhesive is located on the first surface of the front light plate. The first optical adhesive is framed or fully laminated to the first microstructure and the second microstructure. The covering layer is located above an upper surface of the first optical adhesive. The second optical adhesive is located below the second surface of the front light plate.

In one embodiment of the present disclosure, the display device further includes a display panel. The display panel is located below a lower surface of the second optical adhesive. The first microstructure and the second microstructure are configured to refract the light to the display panel.

In one embodiment of the present disclosure, the second microstructure extends towards the covering layer.

In one embodiment of the present disclosure, the first microstructure has a first height. The second microstructure has a second height. The first height of the first microstructure is greater than the second height of the second microstructure.

In one embodiment of the present disclosure, the first width of the first microstructure is greater than the first height of the first microstructure.

In one embodiment of the present disclosure, the first width of the first microstructure is less than the first height of the first microstructure.

In one embodiment of the present disclosure, the second width of the second microstructure is greater than the second height of the second microstructure.

In one embodiment of the present disclosure, the first height of the first microstructure is in a range from 0.035 μm to 9 μm, and the first width of the first microstructure is in a range from 1 μm to 30 μm.

In one embodiment of the present disclosure, the second height of the second microstructure is in a range from 0.005 μm to 0.6 μm, and the second width of the second microstructure is in a range from 0.05 μm to 4.8 μm.

In one embodiment of the present disclosure, the second microstructure is adjacent to an edge of the first microstructure.

An aspect of the present disclosure is related to a front light plate.

According to one embodiment of the present disclosure, a front light plate includes a first microstructure and a second microstructure. The first microstructure has a first width. A conic constant of the first microstructure is in a range from −0.95 to 10. The second microstructure is adjacent to the first microstructure. The second microstructure has a second width. The first width of the first microstructure is greater than the second width of the second microstructure.

In one embodiment of the present disclosure, the first microstructure has a first height. The second microstructure has a second height. The first height of the first microstructure is greater than the second height of the second microstructure.

In one embodiment of the present disclosure, the first width of the first microstructure is greater than the first height of the first microstructure.

In one embodiment of the present disclosure, the first width of the first microstructure is less than the first height of the first microstructure.

In one embodiment of the present disclosure, the second width of the second microstructure is greater than the second height of the second microstructure.

In one embodiment of the present disclosure, the first height of the first microstructure is in a range from 0.035 μm to 9 μm, and the first width of the first microstructure is in a range from 1 μm to 30 μm.

In one embodiment of the present disclosure, the second height of the second microstructure is in a range from 0.005 μm to 0.6 μm, and the second width of the second microstructure is in a range from 0.05 μm to 4.8 μm.

In one embodiment of the present disclosure, the second microstructure is adjacent to an edge of the first microstructure.

In the embodiments of the present disclosure, the front light plate of the display device has the first microstructure and the second microstructure adjacent to the first microstructure. The display device may refract more light to the display panel by the first microstructure and the second microstructure. When more light is refracted to the display pane by the first microstructure and the second microstructure, a brightness difference of the display device between a bright state and a dark state is higher. That is to say, a contrast ratio of the display device between the bright state and the dark state may be improved by the design of the first microstructure and the second microstructure, and a displaying effect of the display device may be improved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
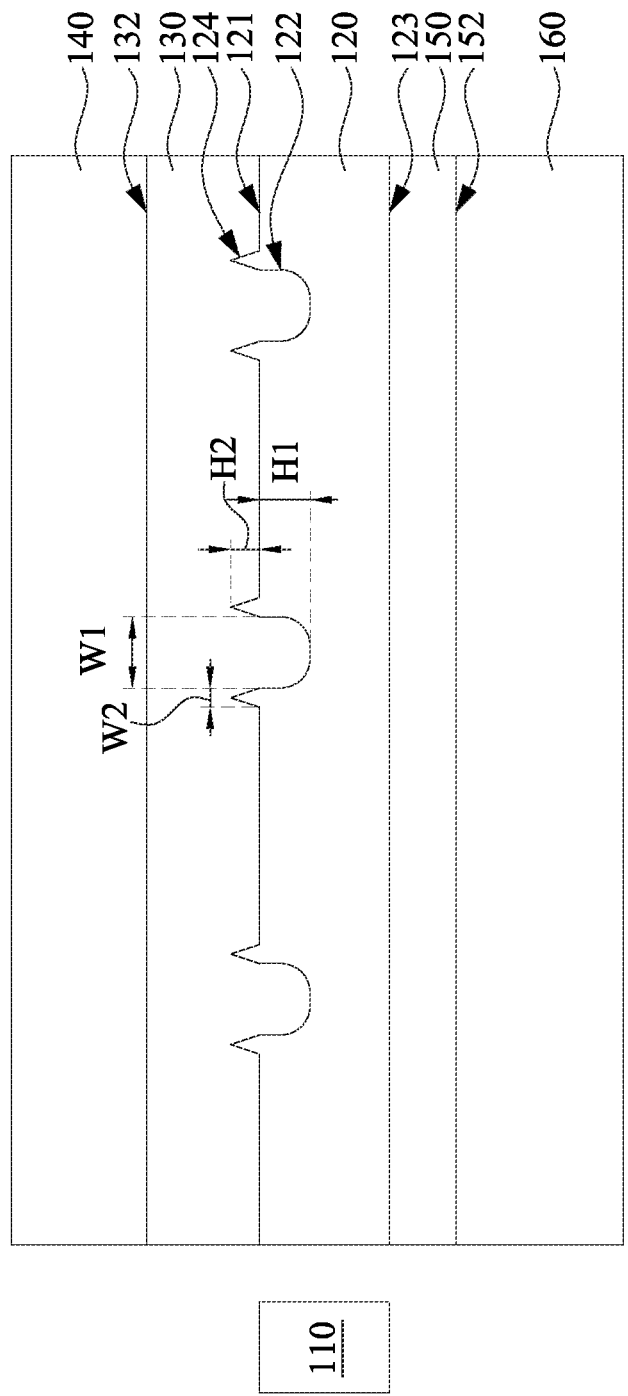
FIG. 1 illustrates a schematic view of a display device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
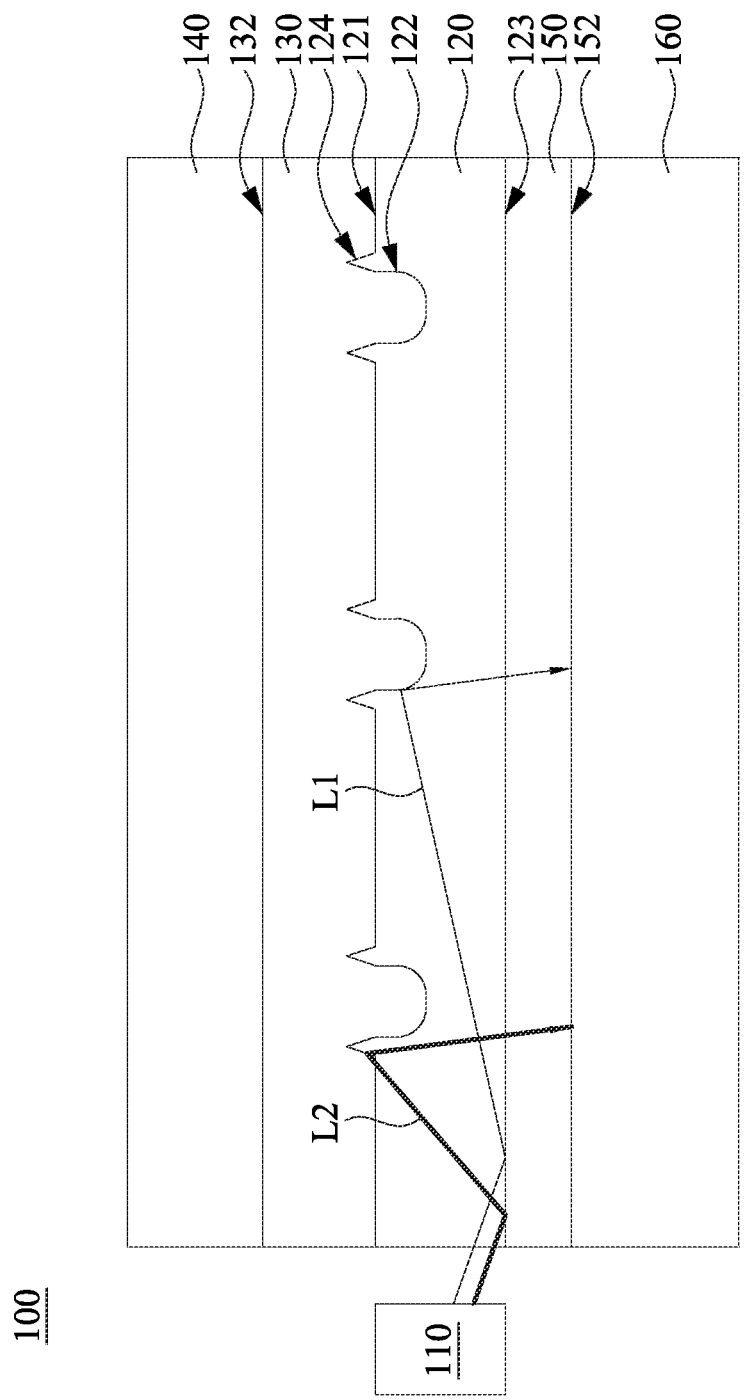
FIG. 2 illustrates a schematic view of using the display device in FIG. 1.

FIG. 1 illustrates a schematic view of a display device 100 according to one embodiment of the present disclosure. FIG. 2 illustrates a schematic view of using the display device 100 in FIG. 1. Referring to both FIG. 1 and FIG. 2, the display device 100 includes a light source 110 and a front light plate 120. The light source 110 of the display device 100 is configured to emit first light L1 and second light L2 to the front light plate 120 of the display device 100. For example, the light source 110 may be a light-emitting diode (LED), but it is not limited in this regard. The front light plate 120 faces toward the light source 110. That is, the light source 110 is located at one side of the front light plate 120. The front light plate 120 is configured to receive the first light L1 and the second light L2 emitted by the light source 110. The front light plate 120 is configured to refract the first light L1 and the second light L2 to a display panel 160.

In some embodiments, the front light plate 120 includes a first microstructure 122 and a second microstructure 124. The first microstructure 122 of the front light plate 120 is located on a first surface 121 of the front light plate 120. The first microstructure 122 of the front light plate 120 has a first width W1. The second microstructure 124 of the front light plate 120 is adjacent to the first microstructure 122. The second microstructure 124 of the front light plate 120 has a second width W2. It is to be noted that a conic constant (such as the K value) of the first microstructure 122 of the front light plate 120 is in a range from −0.95 to 10, and the first width W1 of the first microstructure 122 is greater than the second width W2 of the second microstructure 124.

In some embodiments, the display device 100 further includes a first optical adhesive 130 and a covering layer 140. The first optical adhesive 130 is located on the first surface 121 of the front light plate 120 and may be framed or fully laminated to the first microstructure 122 and the second microstructure 124. The first optical adhesive 130 may be located between the front light plate 120 and the covering layer 140. The covering layer 140 is located above an upper surface 132 of the first optical adhesive 130. For example, the covering layer 140 may be made of a material that includes glass, but it is not limited in this regard.

In addition, the display device 100 further includes a second optical adhesive 150 and the display panel 160. The second optical adhesive 150 is located below a second surface 123 of the front light plate 120. The second optical adhesive 150 may be located between the front light plate 120 and the display panel 160. The front light plate 120 may be located between the first optical adhesive 130 and the second optical adhesive 150. For example, the first optical adhesive 130 and the second optical adhesive 150 may be transparent, so the first light L1 and the second light L2 emitted by the light source 110 may pass through the first optical adhesive 130 and the second optical adhesive 150. The display panel 160 is located below a lower surface 152 of the second optical adhesive 150. The first microstructure 122 and the second microstructure 124 of the front light plate 120 are configured to refract the first light L1 and the second light L2 to the display panel 160 to show patterns of the display panel 160.

Particularly, the front light plate 120 of the display device 100 has the first microstructure 122 and the second microstructure 124 adjacent to the first microstructure 122. The display device 100 may refract more first light L1 and second light L2 to the display panel 160 which is below the front light plate 120 to show patterns of the display panel 160 by the first microstructure 122 and the second microstructure 124. When more first light L1 and second light L2 are refracted to the display panel 160 which is below the front light plate 120 by the first microstructure 122 and the second microstructure 124, a brightness difference of the display panel 160 between a bright state and a dark state is higher. That is to say, a contrast ratio of the display device 100 between the bright state and the dark state may be improved by the design of the first microstructure 122 and the second microstructure 124, and a displaying effect of the display device 100 may be improved.

In some embodiments, the first microstructure 122 of the front light plate 120 extends from the first surface 121 of the front light plate 120 to the second surface 123 of the front light plate 120 opposite to the first surface 121. The second microstructure 124 of the front light plate 120 extends toward the covering layer 140. That is, the first microstructure 122 of the front light plate 120 is concave relative to the first surface 121. The second microstructure 124 of the front light plate 120 is convex relative to the first surface 121. In addition, the second microstructure 124 of the front light plate 120 is adjacent to an edge of the first microstructure 122 to increase a scattering effect of the first light L1 and the second light L2, so that more first light L1 and second light L2 are refracted to the display panel 160 which is below the front light plate 120. A brightness difference of the display panel 160 between a bright state and a dark state may be increased. Therefore, a displaying effect of the display device 100 may be improved.

Figure 3:
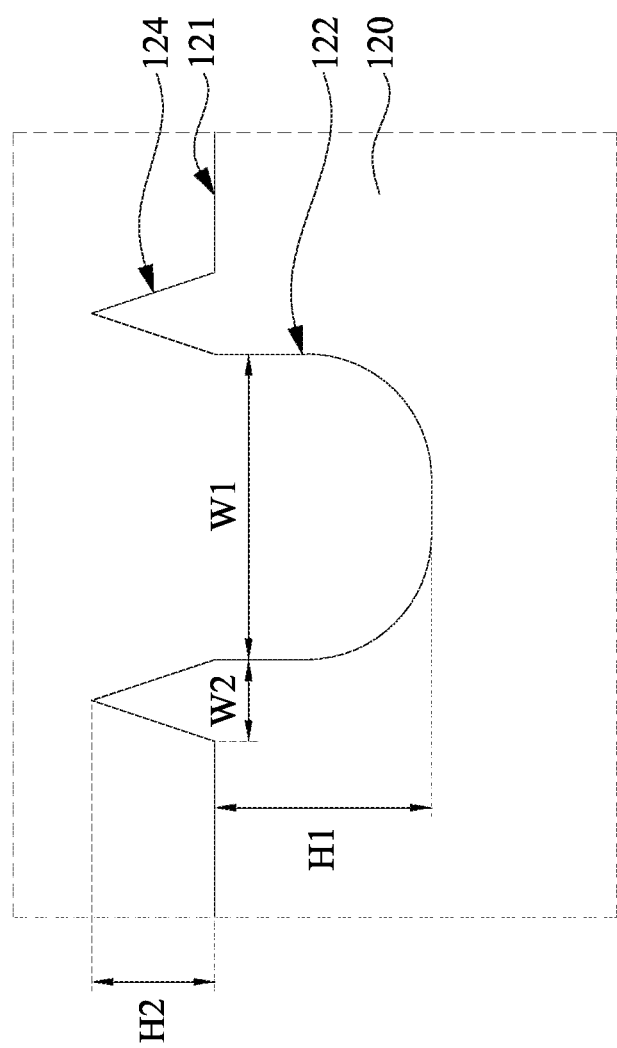
FIG. 3 illustrates a partial enlarged view of a first microstructure and a second microstructure of a front light plate in FIG. 1.

FIG. 3 illustrates a partial enlarged view of the first microstructure 122 and the second microstructure 124 of the front light plate 120 in FIG. 1. Referring to FIG. 2 and FIG. 3, in some embodiments, the first microstructure 122 of the front light plate 120 has a first height H1, and the second microstructure 124 of the front light plate 120 has a second height H2. The first height H1 of the first microstructure 122 is greater than the second height H2 of the second microstructure 124. The first width W1 of the first microstructure 122 is greater than the first height H1 of the first microstructure 122. The second width W2 of the second microstructure 124 is greater than the second height H2 of the second microstructure 124. In some embodiments, the first height H1 of the first microstructure 122 is in a range from 0.035 μm to 9 μm, and the first width W1 of the first microstructure 122 is in a range from 1 μm to 30 μm. The second height H2 of the second microstructure 124 is in a range from 0.005 μm to 0.6 μm, and the second width W2 of the second microstructure 124 is in a range from 0.05 μm to 4.8 μm.

In the following description, another type of a front light plate will be described. It is to be noted that the connection relationship of the aforementioned elements will not be repeated.

Figure 4:
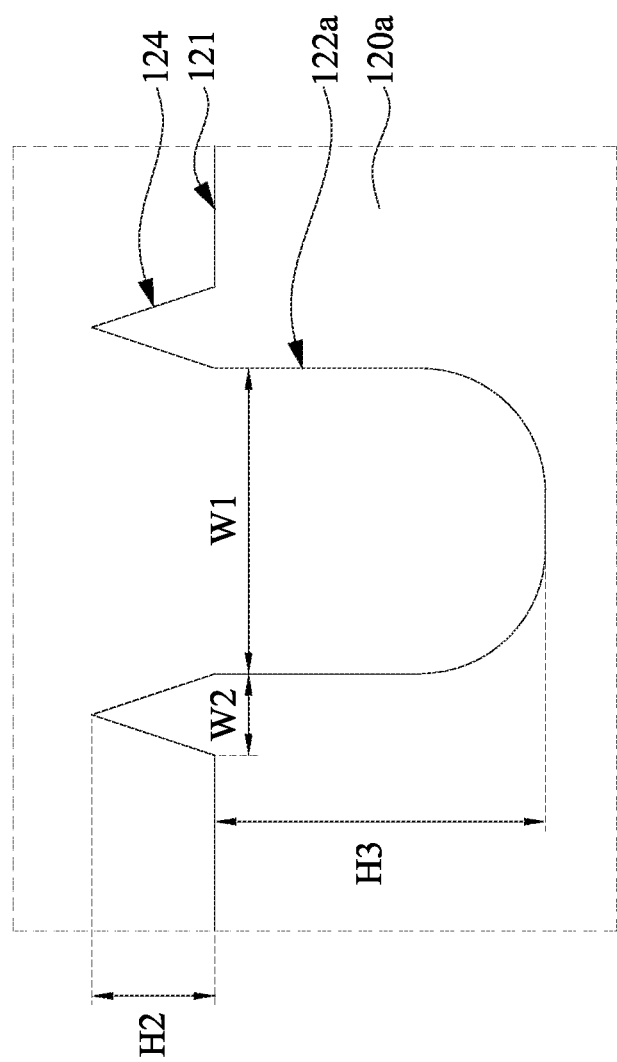
FIG. 4 illustrates a partial enlarged view of a first microstructure and a second microstructure of a front light plate according to another embodiment of the present disclosure.

FIG. 4 illustrates a partial enlarged view of a first microstructure 122a and the second microstructure 124 of a front light plate 120a according to another embodiment of the present disclosure. The difference between the first microstructure 122a of the front light plate 120a shown in FIG. 4 and the embodiment shown in FIG. 3 is that the first microstructure 122a of the front light plate 120a has a third height H3. In this embodiment, the first width W1 of the first microstructure 122a is less than the third height H3 of the first microstructure 122a. In addition, the second microstructure 124 of the front light plate 120a has the second height H2. The third height H3 of the first microstructure 122a is greater than the second height H2 of the second microstructure 124. The second width W2 of the second microstructure 124 is greater than the second height H2 of the second microstructure 124. It is to be noted that a conic constant (such as the K value) of the first microstructure 122a of the front light plate 120a is in a range from −0.95 to 10, and the first width W1 of the first microstructure 122a is greater than the second width W2 of the second microstructure 124.

Referring back to FIG. 1 and FIG. 2, when more first light L1 and second light L2 are refracted to the display panel 160 by the first microstructure 122 and the second microstructure 124 of the front light plate 120, a brightness difference of the display panel 160 between a bright state and a dark state is higher. In addition, the first microstructure 122 of the front light plate 120 extends toward the second surface 123 of the front light plate 120. The second microstructure 124 of the front light plate 120 extends toward the covering layer 140. That is, the first microstructure 122 of the front light plate 120 is concave relative to the first surface 121, and the second microstructure 124 of the front light plate 120 is convex relative to the first surface 121. In some embodiments, the second microstructure 124 of the front light plate 120 is adjacent to an edge of the first microstructure 122 to increase a scattering effect of the first light L1 and the second light L2, so that more first light L1 and second light L2 may be refracted to the display panel 160 which is below the front light plate 120. The brightness difference of the display panel 160 between a bright state and a dark state may be increased, so the displaying effect of the display device 100 may be improved.

In summary, the display device 100 may refract more first light L1 and second light L2 to the display panel 160 by the first microstructure 122 and the second microstructure 124 to show patterns of the display panel 160. When more first light L1 and second light L2 are refracted to the display panel 160 by the first microstructure 122 and the second microstructure 124 of the front light plate 120, the brightness difference of display panel 160 between a bright state and a dark state is higher. That is to say, a contrast ratio of the display device 100 between a bright state and a dark state may be improved by the design of the first microstructure 122 and the second microstructure 124, and the displaying effect of the display device 100 may be improved.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A display device, comprising:
   a light source configured to emit a light;
   a front light plate facing toward the light source and configured to receive the light, and the front light plate comprising:
      a first microstructure located on a first surface of the front light plate and having a first width, wherein the first microstructure extends from the first surface of the front light plate to a second surface of the front light plate opposite to the first surface and a conic constant of the first microstructure is in a range from −0.95 to 10; and
      a second microstructure adjacent to the first microstructure and having a second width, wherein the first width of the first microstructure is greater than the second width of the second microstructure;
   a first optical adhesive located on the first surface of the front light plate and framed or fully laminated to the first microstructure and the second microstructure;
   a covering layer located above an upper surface of the first optical adhesive; and
   a second optical adhesive located below the second surface of the front light plate.

2. The display device of claim 1, further comprising:
   a display panel located below a lower surface of the second optical adhesive, wherein the first microstructure and the second microstructure are configured to refract the light to the display panel.

3. The display device of claim 2, wherein the second microstructure extends towards the covering layer.

4. The display device of claim 1, wherein the first microstructure has a first height, the second microstructure has a second height, and the first height of the first microstructure is greater than the second height of the second microstructure.

5. The display device of claim 4, wherein the first width of the first microstructure is greater than the first height of the first microstructure.

6. The display device of claim 4, wherein the first width of the first microstructure is less than the first height of the first microstructure.

7. The display device of claim 4, wherein the second width of the second microstructure is greater than the second height of the second microstructure.

8. The display device of claim 4, wherein the first height of the first microstructure is in a range from 0.035 μm to 9 μm, and the first width of the first microstructure is in a range from 1 μm to 30 μm.

9. The display device of claim 4, wherein the second height of the second microstructure is in a range from 0.005 μm to 0.6 μm, and the second width of the second microstructure is in a range from 0.05 μm to 4.8 μm.

10. The display device of claim 1, wherein the second microstructure is adjacent to an edge of the first microstructure.

\* \* \* \* \*